May 27, 1958   A. BRUEDER   2,836,431
CONSTANT HEIGHT SUSPENSION DEVICE FOR VEHICLE FRAME
Filed Feb. 1, 1957

United States Patent Office 2,836,431
Patented May 27, 1958

2,836,431

CONSTANT HEIGHT SUSPENSION DEVICE FOR VEHICLE FRAME

Antoine Brueder, Paris, France, assignor to Societe Anonyme Andre Citroen, Paris, France Application February 1, 1957, Serial No. 637,820

Claims priority, application France December 21, 1953

4 Claims. (Cl. 280—112)

The present invention relates to a hydraulic device designed to maintain desirable conditions of equilibrium in a train of wheels mounted on the frame of a vehicle, irrespective of the load distribution.

It has already been proposed to control the hydraulic cylinders connected separately to the wheel-carrying members and to their suspensions by means of a rocker of which the angular position is a function of the load variation, so as to compress the cylinders of the loaded suspension and to release those of the unloaded suspension to restore the equilibrium therebetween; this device is compulsorily reversible, in that an inclination of the axles relative to the frame produces an inclination of the rocker; on the other hand the fact that the rocker should have a considerable mass makes it impossible or extremely difficult to quickly restore the system, due to its inertia, and finally the resulting correction is not complete because a permanent equilibrium is obtained between the stress and the righting effort.

It is already know to avoid these inconveniences, as set forth in the co-pending U. S. pat. application Ser. No. 422,636 filed by the same applicant and now Patent No. 2,787,474, dated April 2, 1957, by interconnecting the hydraulic suspension devices rigid with the frame and pivoted on the wheel-carrying members and also by controlling the circulation of the fluid between these devices by interposing therebetween a slide valve connected to a pump rotating at a constant velocity and operable by the movements of parts rigid with said wheel-carrying members so as to direct the fluid drawn from the loaded suspension cylinder to the unloaded suspension cylinder.

This invention is concerned with an improved device for restoring automatically and instantaneously the equilibrium or balance of a train of wheels in case of frame inclination, by means of a pump adapted to rotate instantaneously in one or the other direction for delivering fluid to the side to be rightened, this impulse being controlled from a member responsive to and interpreting the undesired frame inclination which is to be corrected.

In the accompanying drawing forming part of this specification there is shown diagrammatically by way of example a typical embodiment of a suspension system controlled in accordance with the principles of this invention. In the drawing.

Figure 1:
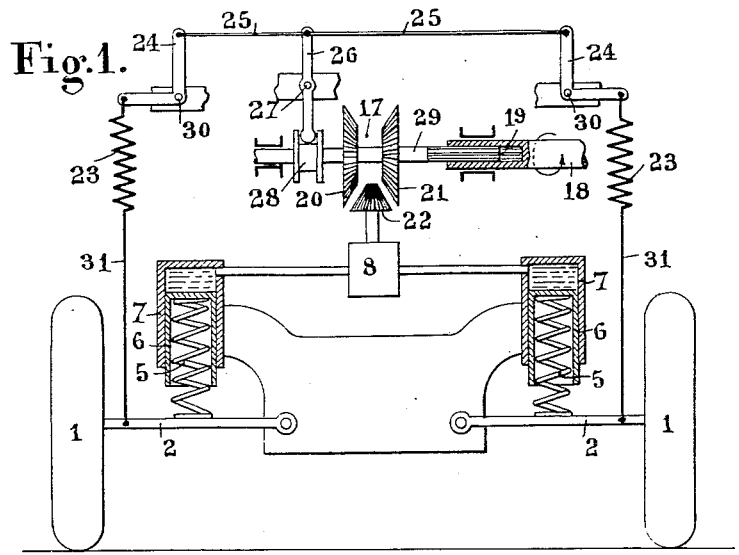
Figures 1 and 2 show the suspension system.

In the arrangement illustrated, the pump 8 is adapted to rotate in either direction, according as the compensating fluid is to be delivered from the left-hand side to the right-hand side, or vice-versa.

The reversing of the direction of rotation of this pump is obtained by means of a double coupling gear 17 mounted on the driving shaft 18 and operable from the engine of the vehicle or from an auxiliary motor; the shaft 18 consists of two parts coupled for relative sliding movement with each other, for example as shown at 19.

The elements 20 and 21 of the coupling gear 17 are thus displaceable along their common axis of rotation 29 so that one of them will come into meshing engagement with the gear element 22 driven by the pump 8 and thus operate this pump in one or the other direction, the pump being inoperative when both elements 20, 21 are disengaged from the element 22, i. e. in the intermediate position shown in the drawing.

The coupling gear 17 is operated by the vertical displacement of the wheels 1 through rods 31 connected to the wheel-carrying members or axles 2 and with each other, in each train of wheels, through an assembly comprising the resilient links 23, rockers 24 fulcrumed on fixed poinst 30, upper rods 25, a lever 26 fulcrumed at 27 and a grooved collar 28 rigid with the shaft 29 of coupling gear 17.

Due to the permanent rotary motion of this shaft 29 the collar 28 may be mounted for loose rotation on this shaft to avoid any frictional contact with the lever 26; on the other hand, the lower end of this lever which co-acts with the collar 28 may be provided with a ball or roller to reduce friction.

The assembly described hereinabove operates as follows: When the two wheels are level with each other, the elements are so positioned that the coupling wheels 20 and 21 are disengaged from the pump-driving pinion 22 and therefore the pump 8 is inoperative (as shown in Fig. 1).

Figure 2:
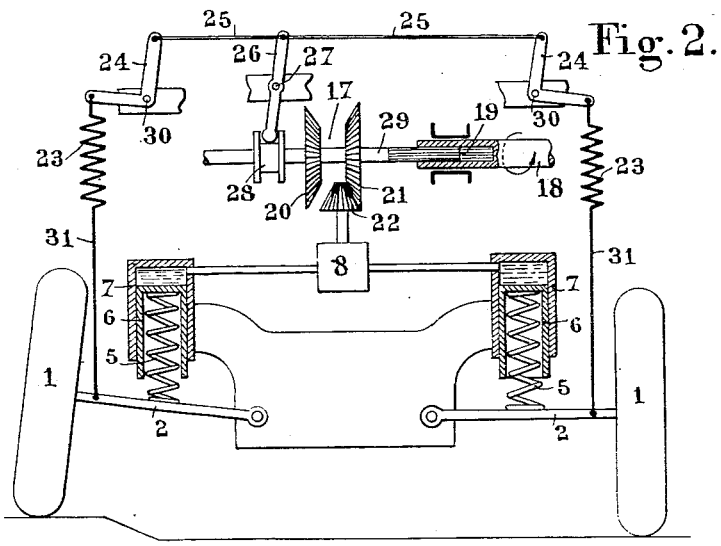
Figure 3:
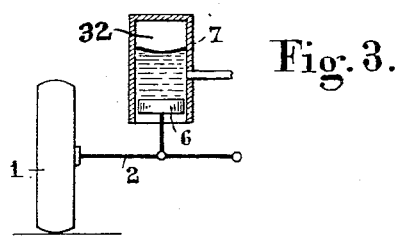
Figure 3 is a fragmentary view of a modified detail of this system.

When an impulse is applied to one wheel which tends to tilt the vehicle, for example if the left-hand wheel of Figs. 1 and 2 engages a road bump or like obstacle, the spring 5 of the hydro-elastic shock-absorber 6, 7 is compressed on the left-hand side, the left-hand link 31 is moved upwards, and the resilient elements 23 ensure a permanent tension of the control members (position of Fig. 2).

For a given displacement of the wheel the system incorporating the two resilient elements 23 assumes a state of equilibrium which causes the lever 26 to take a position other than the inoperative position of Fig. 1, so that the collar 28 is moved to the left, in the case contemplated herein, to cause the meshing engagement of the coupling gear elements 21 and 22 with each other.

Thus, the pump 8 is actuated in the appropriate direction to feed fluid drawn from the left-hand corrector cylinder to the right-hand corrector cylinder; as a result, the compensating downward movement of the right-hand wheel is caused by the obstacle having moved the left-hand wheel upwards; in fact, this compensating movement consists in raising the right-hand portion of the vehicle relative to the ground and therefore counteracting the inclination of the vehicle; consequently, it is evident that the device acts as an anti-roll device.

This invention relates preferably to high-pressure hydraulic apparatus of which the operation is ensured by means of a relatively low quantity of liquid; the pump operation does not require high rotational speeds and the desired correction may be accomplished in a few revolutions, or even a fraction of a revolution of the pump movable member or impeller.

The coupling gear proper may be of any types known per se, the type illustrated being well-known in machine-tool construction. It may be operated in a very progressive manner by providing adequate friction linings ensuring a nearly continuous speed change or variation by virtue of a gradually established contact pressure and a moderate slip at the beginning of the coupling movement.

Although this device has been described and illustrated with reference to hydraulic shock absorbers 6, 7 provided with springs 5, it will be readily understood that hydropneumatic shock-absorbers 7 may also be used, the fluid mass compressed in the chamber 32 remaining unaltered before and after the correction.

What I claim is:

1. A device for maintaining at a constant height the frame of a vehicle relative to the vehicle wheels irrespective of the load distribution, which comprises for each wheel a support pivoted on the frame and a fixed hydroelastic suspension cylinder, a constant-volume fluid connection between the two cylinders of each train of wheels, a pump interposed in said fluid connection, a mechanical linkage between the two wheel supports, a driving shaft, a coupling gear constantly driven from said driving shaft, the driven pinion of said coupling gear controlling the rotation of said pump in one or the other direction, pinions mounted on said driving shaft, and means connected to said mechanical linkage connecting the wheel supports for controlling the meshing engagement of one of said pinions with said driven pinion for rotating said pump in one or the other direction and thus load the cylinder of the unloaded suspension while unloading the loaded suspension.

2. A device for maintaining at a constant height the frame of a vehicle relative to the vehicle wheels irrespective of the load distribution, which comprises for each wheel a support pivoted on the frame and a fixed hydroelastic suspension cylinder, a constant-volume fluid connection between at least the two cylinders of each train of wheels, a pump interposed in said fluid connection, a member for operatively interconnecting said two wheel supports, a driving shaft, a coupling gear, a sliding member for driving said coupling gear from said driving shaft, the driven pinion of said coupling gear being adapted to drive said pump, a pair of driving pinions mounted on said driving shaft on either side of said driven pinion, a control member for said two driving pinions which is connected to said wheel-support connecting member for causing one or the other of said driving pinions to mesh with said driven pinions according to the desired direction of rotation of said pump so as to load the suspension cylinder on the inclined side at the detriment of the suspension cylinder on the raised side.

3. A device for maintaining at a constant height the frame of a vehicle relative to the vehicle wheels, irrespective of the load distribution, which comprises, for each wheel, a support pivoted on the frame and a fixed hydropneumatic suspension cylinder, a constant-volume fluid connection between at least the two cylinders of each train, a pump interposed in said fluid connection, a member for interconnecting the two wheel supports of a same train of wheels, a driving shaft, a coupling gear, a sliding member for driving said coupling gear from said driving shaft, the driven pinion of said coupling gear being adapted to drive said pump, two driving pinions mounted on said driving shaft on either side of said driven pinion, a collar mounted for loose rotation on said pinion-driving shaft, a lever fulcrumed on the frame and having one end connected to said wheel-support connecting member and the other end connected to said collar so as to cause one or the other of said driving pinions to mesh with said driven pinion according to the desired direction of rotation of the pump in order to load the suspension cylinder on the inclined side at the detriment of the suspension cylinder on the raised side.

4. A device for maintaining at a constant height the frame of a vehicle relative to the wheels irrespective of the load distribution, which comprises for each wheel a support pivoted on the vehicle frame and a fixed hydroelastic suspension cylinder, a constant-volume fluid connection interconnecting said two cylinders of each train of wheels, a pump interposed in said fluid connection, a mechanical linkage between said two wheel supports, resilient members interposed along said linkage, a driving shaft, a coupling gear driven from said driving shaft, the driven pinion of said coupling gear controlling the pump rotation in one or the other direction, pinions mounted on said driving shaft, and means connected to said wheel-support connecting linkage for controlling the meshing engagement of one of said pinions with said driven pinion for causing said pump to rotate in one or the other direction to load the unloaded suspension cylinder at the detriment of the loaded suspension.

References Cited in the file of this patent

FOREIGN PATENTS 748,581   Great Britain _____ May 2, 1956